United States Patent [19]

Nemecz et al.

[11] 3,937,786

[45] Feb. 10, 1976

[54] PRODUCTION OF ALUMINUM CHLORIDE FROM RAW MATERIALS CONTAINING COAL

[75] Inventors: Ernő Nemecz, Budapest; Aurél Ujhidy, Veszprem; Károly Polinszky, Budapest; János Szépvölgyi, Veszprem; Oszkár Borlai, Budapest; László Kápolyi, Budapest; Tamás Székely, Budapest, all of Hungary

[73] Assignee: Toth Aluminum Corporation, New Orleans, La.

[22] Filed: June 20, 1974

[21] Appl. No.: 481,543

[30] Foreign Application Priority Data

June 28, 1973 Hungary.................. 16126

[52] U.S. Cl. ............... 423/136; 423/137; 423/496
[51] Int. Cl.² ........................................ C01F 7/56
[58] Field of Search ............ 423/136, 137, 496, 495

[56] References Cited
UNITED STATES PATENTS

| 1,375,116 | 4/1921 | Shoeld | 423/496 |
| 1,508,451 | 9/1924 | Gray et al. | 423/136 |
| 1,865,008 | 6/1932 | Holm | 423/136 |
| 1,875,105 | 8/1932 | Mugglaton et al. | 423/136 |
| 2,832,668 | 4/1958 | Culberson et al. | 423/136 |
| 3,793,003 | 2/1974 | Othmer | 423/136 |

FOREIGN PATENTS OR APPLICATIONS

| 281,491 | 12/1927 | United Kingdom | 423/136 |
| 1,138,975 | 1/1969 | United Kingdom | 423/136 |

Primary Examiner—Edward Stern
Attorney, Agent, or Firm—Holman & Stern

[57] ABSTRACT

A process for the production of aluminum chloride from raw materials such as coal slate or bituminous shale is disclosed. The raw material should preferably have an ash content of at least 30% by weight, and with the aluminum content of the ash being at least 20%, calculated as $Al_2O_3$. The raw material is first calcined and then chlorinated with a gaseous stream containing chlorine and carbon monoxide to form the aluminum chloride product.

5 Claims, No Drawings

PRODUCTION OF ALUMINUM CHLORIDE FROM RAW MATERIALS CONTAINING COAL

BACKGROUND AND SUMMARY OF THE INVENTION

As is well known in the art, bauxite is the primary raw material which is suitable for production of aluminum. Many of the bauxite deposits of a quality required for the Bayer process have almost become exhausted, with the result that extensive research has been conducted on other means of obtaining alumina compounds from other naturally occurring minerals, rocks and other substances which contain alumina.

An important technique for such recovery, which has received much recent attention, involves chlorination of these materials to produce anhydrous aluminum chloride. These chlorination processes can use, as raw materials, clay, bauxite of inferior quality, and other aluminum-containing materials. The essence of these processes is that some suitable reducing material is mixed with the starting aluminum-containing material and the mixture is treated with a suitable chlorinating agent. Coal, coke, or other carbon-containing material, e.g., carbon monoxide, are used as reducing agents. To obtain a product free from water, the physically and chemically bound water is first removed by preliminary heating and calcination.

It has been found, however, that the known processes of the type referred to above have several disadvantages. For example, the speed of the reaction is, from a practical point of view, too slow, while the conversion of alumna is considerably less than the theoretical value. This is probably due to the fact that, in the system to be chlorinated, the raw material containing the aluminum oxide forms a heterogeneous phase with the reducing material, and these two constituents are separated, even after thorough grinding and mixing, with resulting boundary surfaces which deleteriously influence the reactivity and speed of the reaction.

In accordance with the present invention, it has been found that the above disadvantages can be avoided, and excellent, nearly theoretical conversions to aluminum chloride can be obtained, if aluminum and the carbon-containing reducing agent are molecularly or substantially molecularly dispersed in a practically homogeneous phase, together with the chlorinating agent. Such conditions are satisfied by certain naturally occurring types of coal having a high ash-content. These include, in accordance with the coal-mineral classification, (1) coal slate, and (2) bituminous shale. Characteristically, the ash-content is from about 30 to 50% weight for (1) and over 50% by weight for (2).

The ash of the above minerals are of two main types, depending on the geological circumstances of charring, these types of ash being the so-called clay and pyrite types. Particularly preferred are those raw materials which provide an ash with pyrite content. Furthermore, those materials providing an ash having a high aluminum content, i.e., those with at least 20% by weight of aluminum, calculated as $Al_2O_3$, are preferred. Such material is to be found in the so-called knots rock, in which the carbon portion is in the form of very fine bituminite distribution, which is, from the point of view of chlorination, highly advantageous.

Thus the present invention comprises the process of production of aluminum chloride, free from water, by chlorination at high temperature. As raw material, coal slate, bituminous shale, carbonaceous and/or bituminous materials in which the ash content is at least 30% by weight and the ash contains at least 20% by weight of aluminum calculated as $Al_2O_3$ are used. This starting material is preferably ground, and the ground phase is calcined with simultaneous coking. The material so prepared is subjected to the action of chlorinating materials such as chlorine gas at high temperatures, about 700° to 1000°C, preferably in the presence of other reducing materials, e.g., carbon monoxide, and the aluminum chloride product free of water, is separated from the high temperature gas mixture.

DESCRIPTION OF THE PREFERRED EMBODIMENTS

The present invention will be more clearly understood from the following examples, although the invention is not in any way intended to be thereby limited.

EXAMPLE NO. 1

Coal slate of 1600 kcal caloric value, ground to powder (grain size 0.01–0.02 mm) was calcined in a rotary furnace with ceramic lining in a reducing atmosphere at a temperature of between 700°–800°C. As calcination proceeded, the raw material was simultaneously coked. The velocity of the solid material was adjusted such that total time in the heated zone was about ½ – 1 hour. After calcination/coking, the product was chlorinated in a mixture of carbon monoxide and chlorine gas in a 1:1–3 proportion at 700°–1000°C. Chlorination was also conducted in a rotary furnace with ceramic lining. Passage through the heated zone lasted, on the average, about 90 minutes. The original $SiO_2$-content of the sample was 21.3%, the $Al_2O_3$-content 22.3%, and the carbon content 42.7%. Thus, the raw material has an ash content in excess of 30% (57.3%) and an alumina content of the ash greater than 20% (38.9%). The mixture leaving the furnace had only 0.4% carbon-content. $Al_2O_3$ content of the remainder was 9.2%. Conversion, referred to aluminum oxide and calculated from the weight of the aluminum chloride obtained, was 54%.

EXAMPLE NO. 2

Powder of naturally occurring carbonaceous material with a grain size of 0.2–0.5 mm, having a caloric value of 3000 kcal, was calcined with a mixture of nitrogen and carbon monoxide in the proportion of 2–5:1, in a fluidization reactor for 20–40 minutes. During calcination, coking of the material took place simultaneously. After calcination/coking, the product was chlorinated, also in the fluidization reactor, at a temperature of 700°–1000°C with a mixture of chlorine, carbon monoxide, and nitrogen in the proportion of 1–3:1:3–5. Duration of the chlorination was 60–90 minutes. The starting material contained 10.5% $SiO_2$, 16.2% $Al_2O_3$ and 64.8% carbon. Here the ash content of the carbonaceous material is 35.2% and the alumina content of the ash is 46% which meet the required minimum 30% and 20% values, respectively. Upon completion of the reaction, the mixture contained 3.2% aluminum oxide. The calculated $Al_2O_3$ conversion on the basis of the aluminum chloride formed was 81.3%.

It is claimed:

1. A process for production of aluminum chloride consisting essentially the steps of: comminuting bituminous shale having an ash content of approximately 50% by weight and the aluminum content of the ash being at least 20%, calculated as $Al_2O_3$; calcining the bituminous shale to remove physically and chemically bound water and to cause coking; and chlorinating the calcined bituminous shale with a gaseous stream containing chlorine and carbon monoxide to form the aluminum chloride.

2. The process of claim 1 wherein the chlorinating step is carried out at a temperature of from 700° to 1000°C.

3. The process of claim 1 wherein the ratio of chlorine to carbon monoxide employed in the chlorinating step is 1–3:1.

4. The process of claim 1 wherein the bituminous shale contains ash selected from the group consisting of clay and pyrite.

5. The process of claim 1 wherein the bituminous shale comprises knots rock.

* * * * *